Nov. 22, 1955    E. P. DRAKE ET AL    2,724,550
FLUSH MOUNTED CASH REGISTER

Filed April 29, 1952    11 Sheets-Sheet 1

INVENTORS,
Edward P. Drake
BY Robert E. Boyden

ATTORNEY

Nov. 22, 1955  E. P. DRAKE ET AL  2,724,550
FLUSH MOUNTED CASH REGISTER
Filed April 29, 1952  11 Sheets-Sheet 2

INVENTORS,
Edward P. Drake
BY Robert E. Boyden

ATTORNEY.

Nov. 22, 1955  E. P. DRAKE ET AL  2,724,550
FLUSH MOUNTED CASH REGISTER
Filed April 29, 1952  11 Sheets-Sheet 4

INVENTORS,
Edward P. Drake
BY Robert E. Boyden

ATTORNEY.

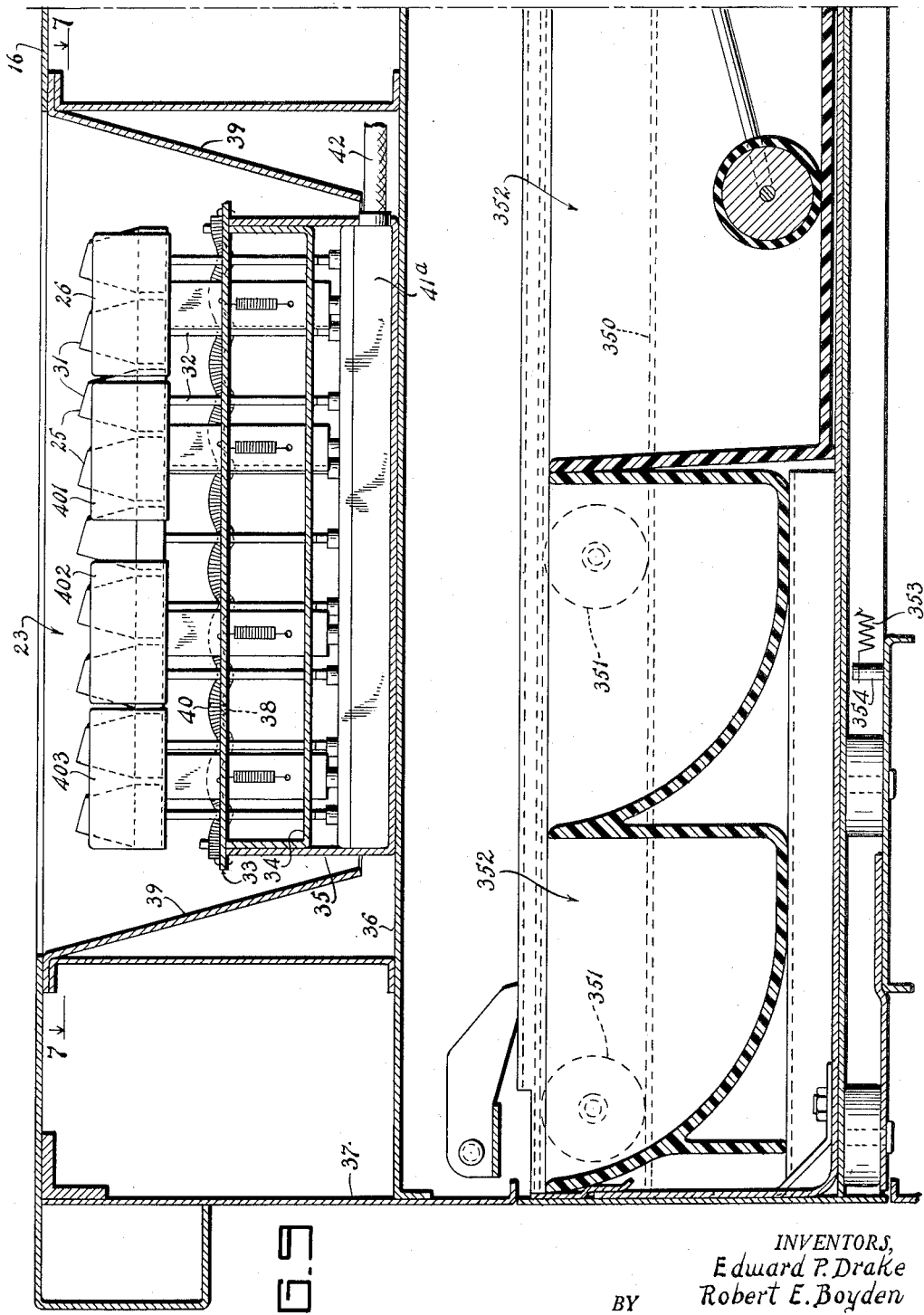

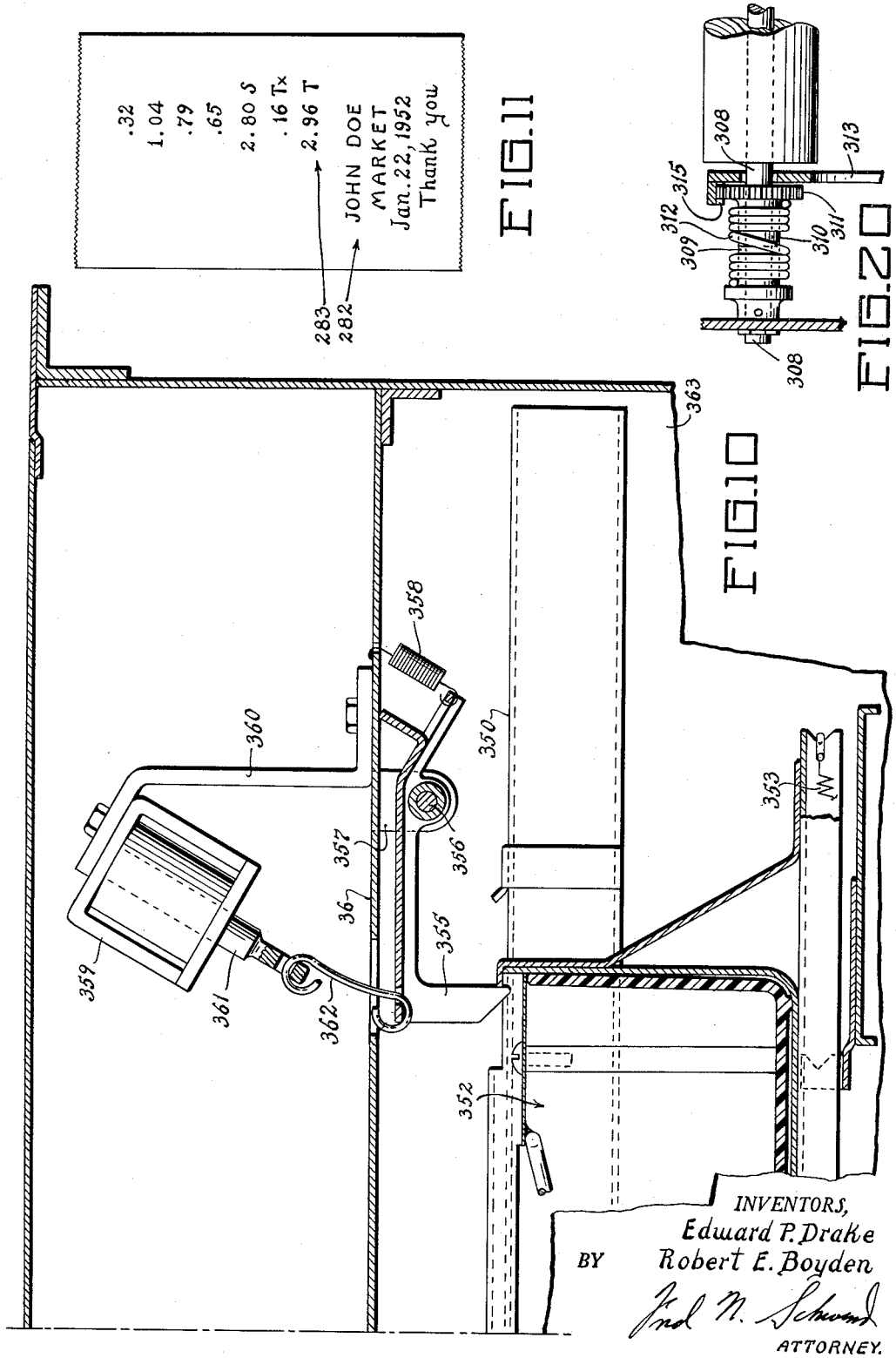

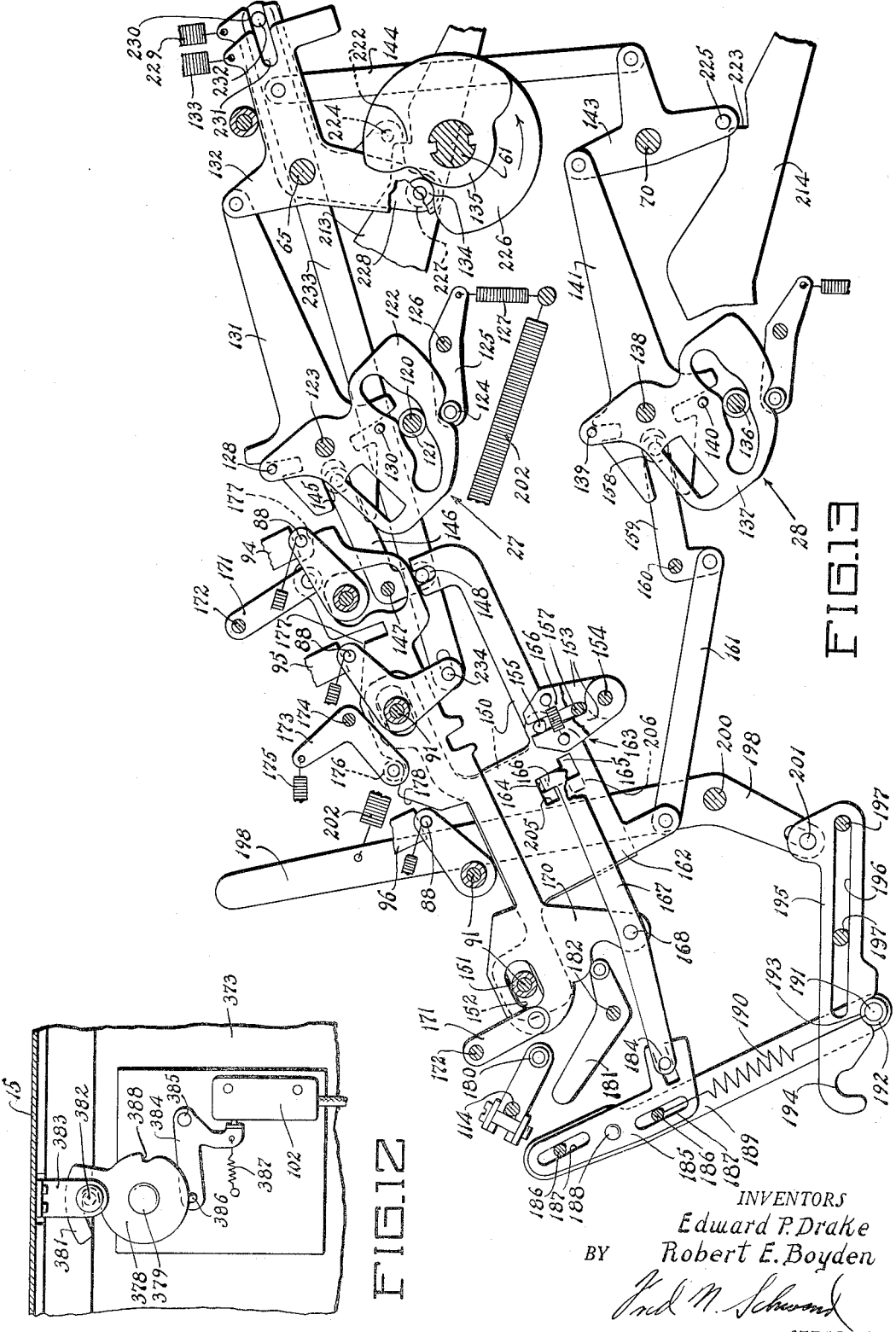

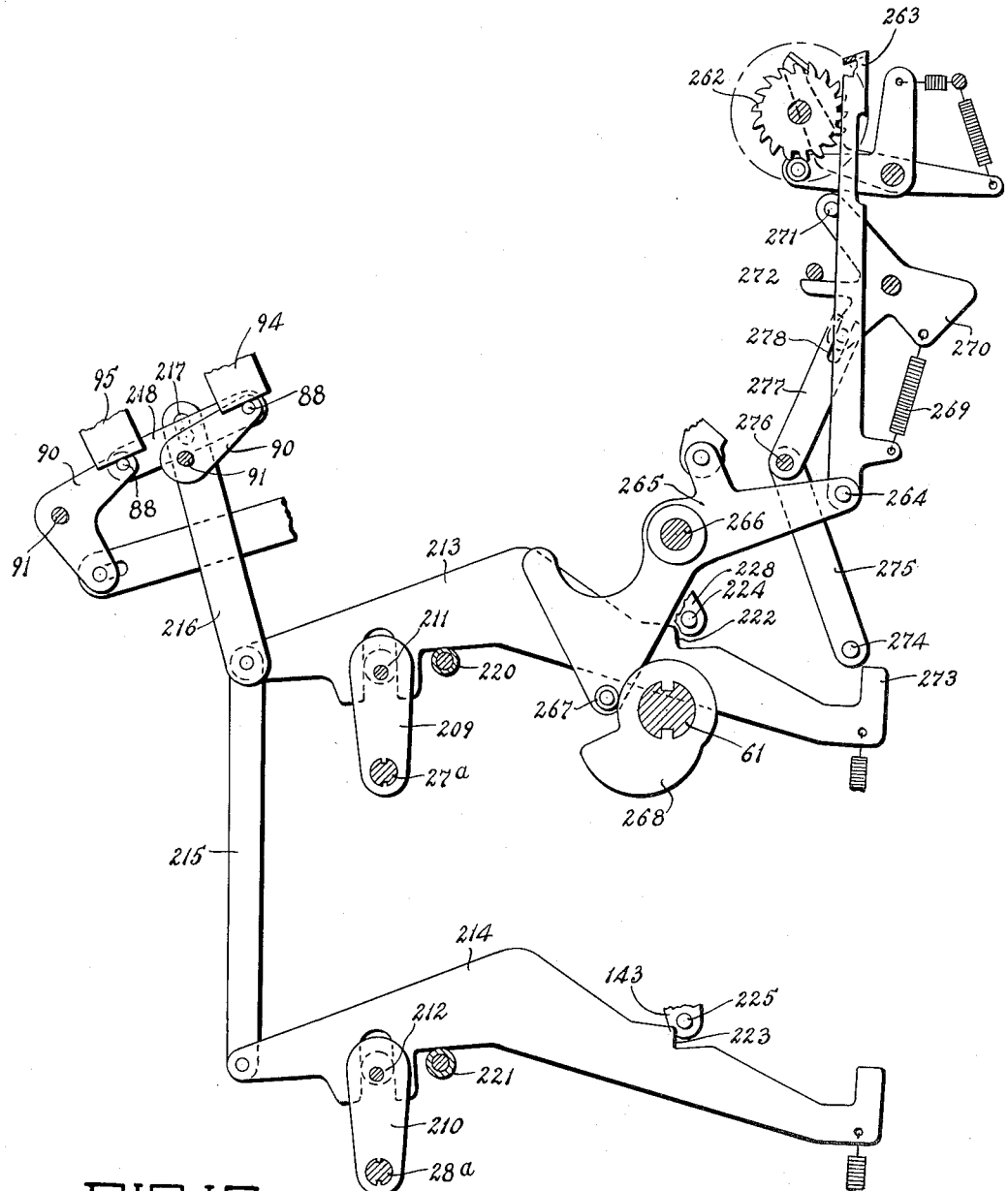

Nov. 22, 1955  E. P. DRAKE ET AL  2,724,550

FLUSH MOUNTED CASH REGISTER

Filed April 29, 1952  11 Sheets-Sheet 10

INVENTORS,
Edward P. Drake
Robert E. Boyden
BY
ATTORNEY

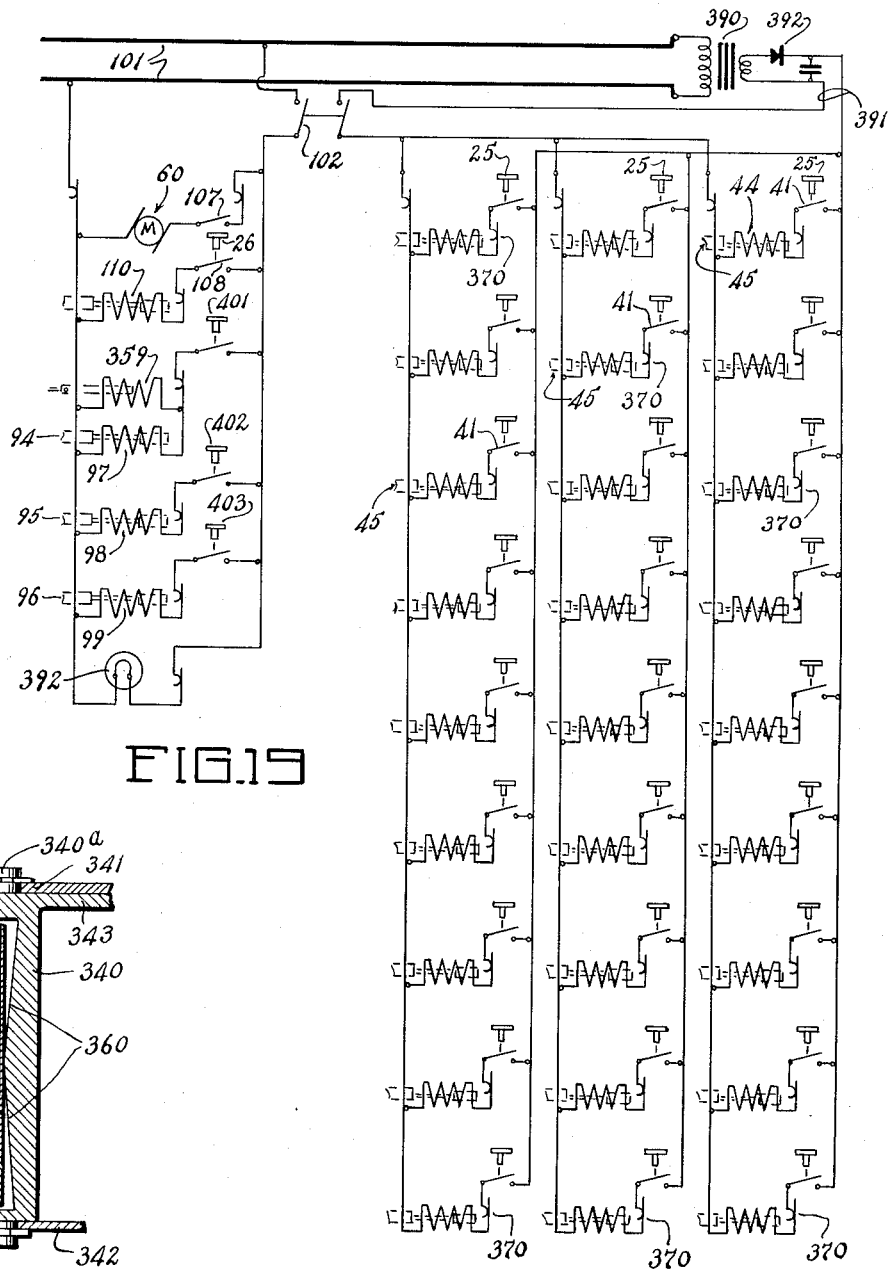

United States Patent Office 2,724,550
Patented Nov. 22, 1955

2,724,550

FLUSH MOUNTED CASH REGISTER

Edward P. Drake, Glendale, and Robert E. Boyden, San Gabriel, Calif., assignors to Clary Multiplier Corporation, a corporation of California Application April 29, 1952, Serial No. 284,935

11 Claims. (Cl. 235—3)

This invention relates to computing machines and has particular reference to cash registering equipment and the like.

Heretofore, cash registering machines have been manufactured and sold in self-contained units intended to be mounted on top of a counter or table in a position to be conveniently operated by a cashier or clerk.

In grocery stores, department stores and similar installations where merchandise is handled by a cashier, it is obviously highly desirable to have the cash register in as close proximity to the counter as possible in order to make the sales transaction with a minimum amount of effort and time lag.

In cases where the cash register has been placed directly on the counter, valuable counter space is taken up and other portions of the counter are hidden from view by the register. On the other hand, where the cash register is placed on a table adjacent the counter, the cashier must turn from the counter to the cash register one or more times during each sales transaction which involves extra effort and time delay, as well as diversion of the cashier's attention, which is conducive to possible error.

It therefore becomes the principal object of the present invention to obviate the above-noted difficulties inherent in previous cash registering equipment.

Another object is to arrange the controls for a cash register in such position that a cashier or clerk need not turn from or otherwise divert his attention from the sales counter.

A further object of the invention is to mount a cash registering machine below a counter level and to arrange the various controls for such machine substantially flush with the counter surface.

Another object of the invention is to facilitate servicing and inspection of a cash register machine or the like.

A further object is to remotely control operation of a cash registering machine or the like.

A still further object is to enable articles of merchandise to be placed on and slid over a cash register and controls therefor without causing malfunctioning of the same.

The manner in which the above and other objects of the invention are accomplished will be readily understood on reference to the following specification when read in conjunction with the accompanying drawings wherein.

Figures 1, 2:
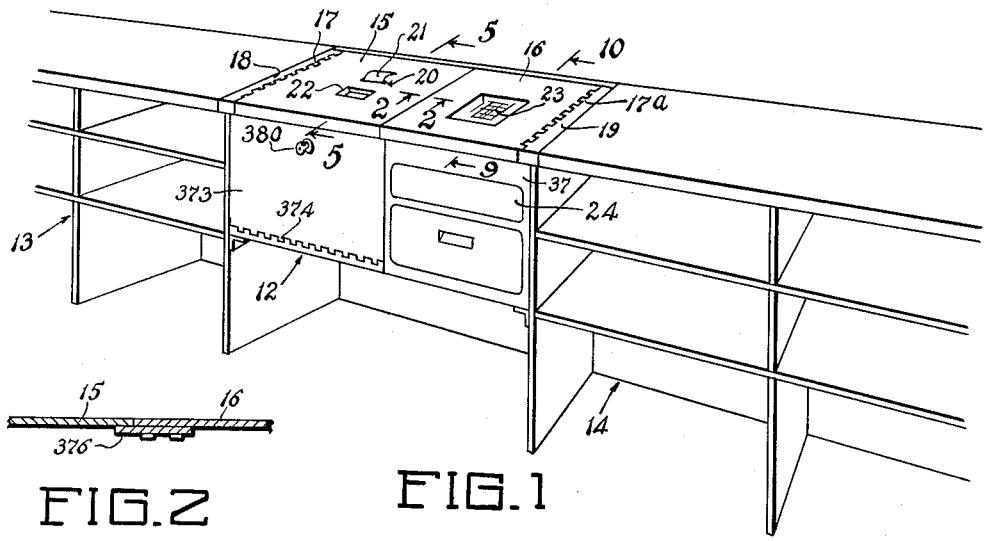
Fig. 1 is a perspective view, from a cashier's position, of a cash register installation embodying the present invention.
Fig. 2 is a transverse sectional view through adjoining portions of the deck panels and is taken along the line 2—2 of Fig. 1.

Figs. 9 and 10 conjointly illustrate a longitudinal sectional view through the keyboard and drawer sections of the machine and are taken substantially along the lines 9—10 of Fig. 1.

Fig. 11 illustrates a sample tape obtained from the machine of the present invention.

Figure 5:
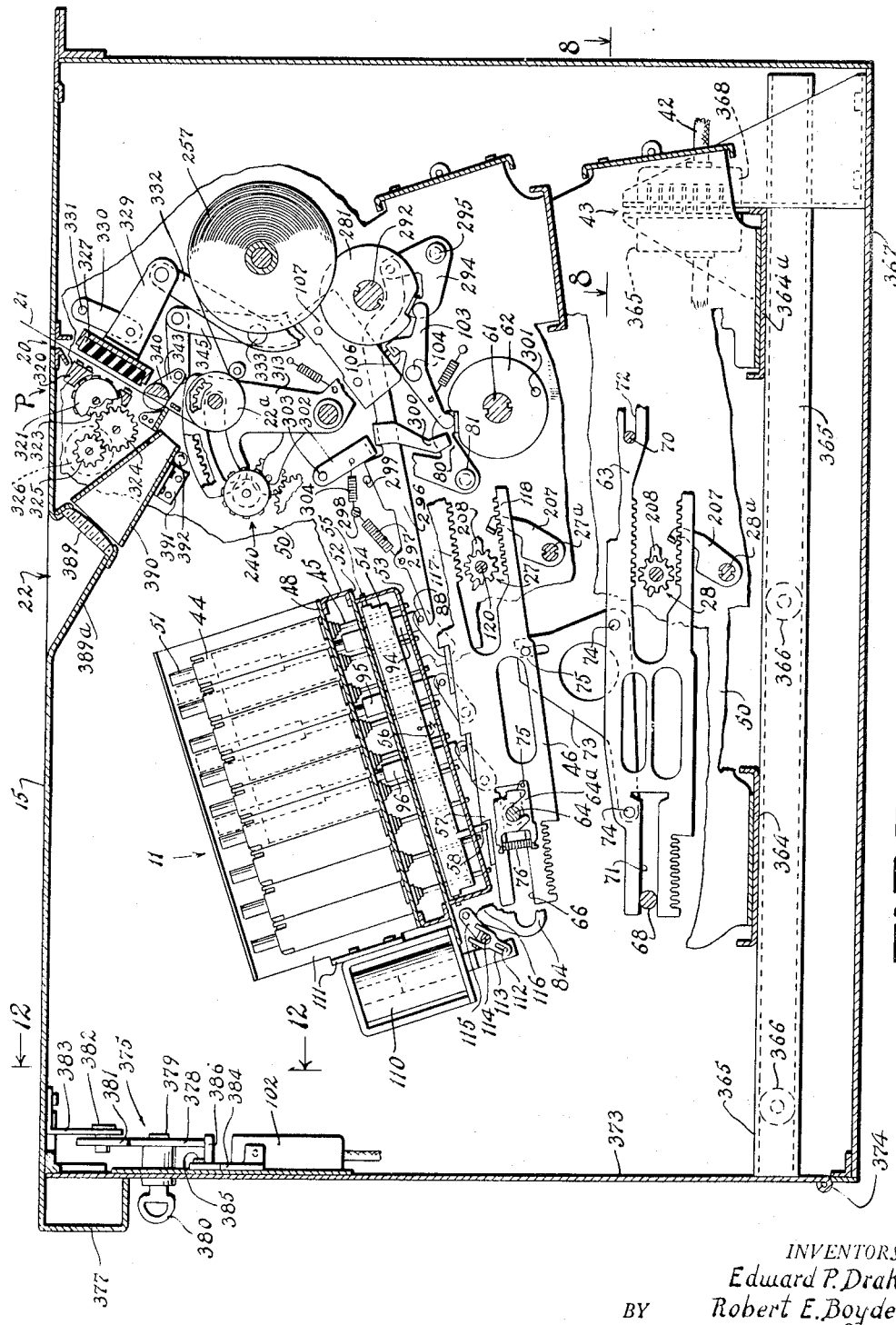
Fig. 5 is a longitudinal sectional view through the machine and is taken substantially along the line 5—5 of Fig. 1.

Fig. 12 is a sectional rear view taken substantially along the line 12—12 of Fig. 5 illustrating the cabinet lock and master switch controlled thereby.

Fig. 13 is a sectional elevational view illustrating the accumulator controls with the machine in full cycle position.

Figure 14:
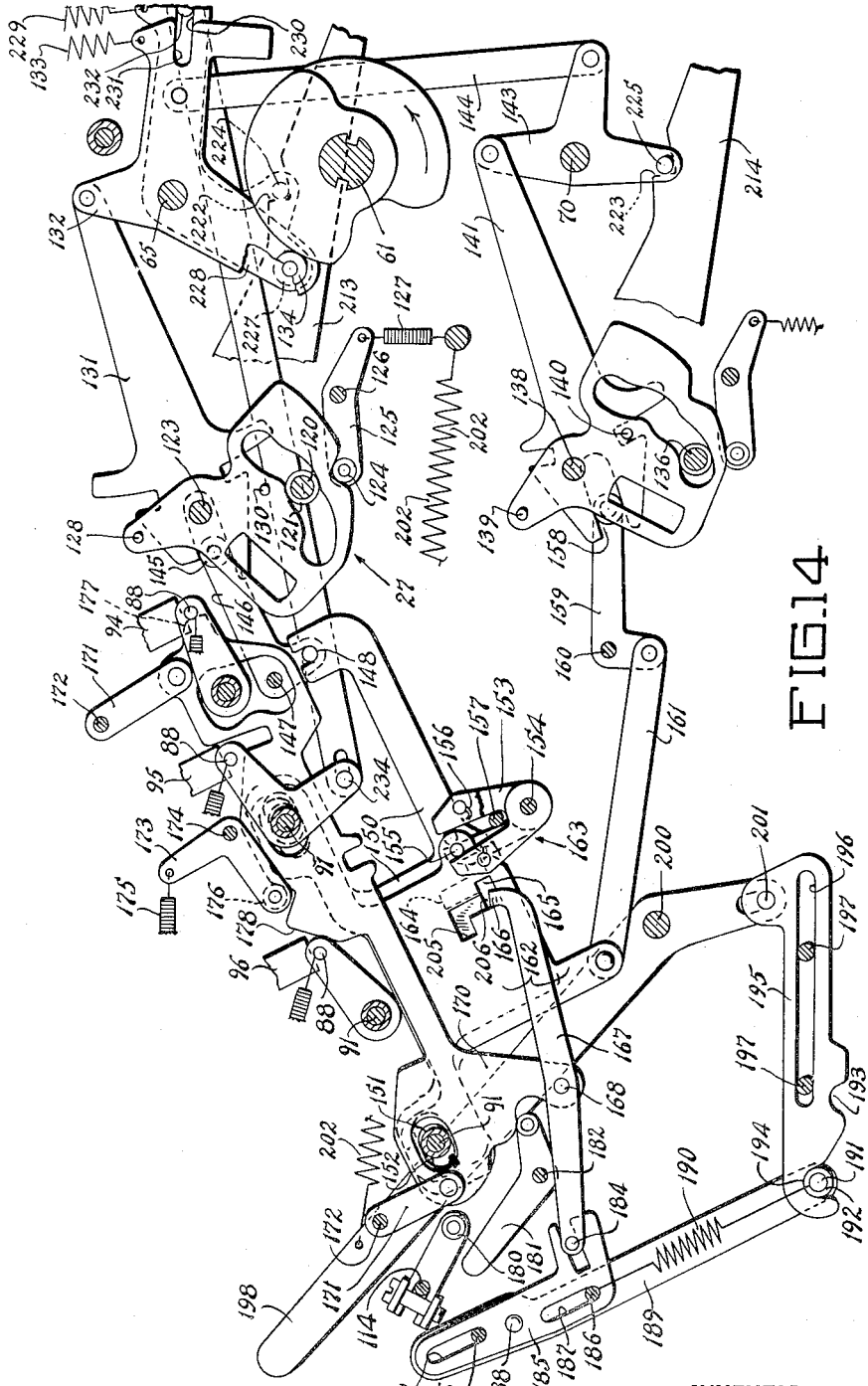

Fig. 14 is a sectional elevational view similar to that of Fig. 13 but illustrating the machine in a partial cyclic position and with the controls set to effect a grand totalling operation.

Fig. 15 is a sectional elevational view illustrating part of the totalling controls and the paper and ribbon feed mechanism.

Figure 16:
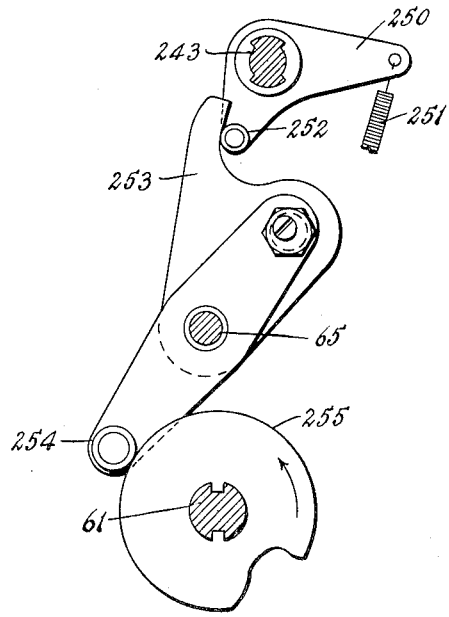

Fig. 16 is a sectional elevational view illustrating the amount printer control shaft operating mechanism.

Figure 17:
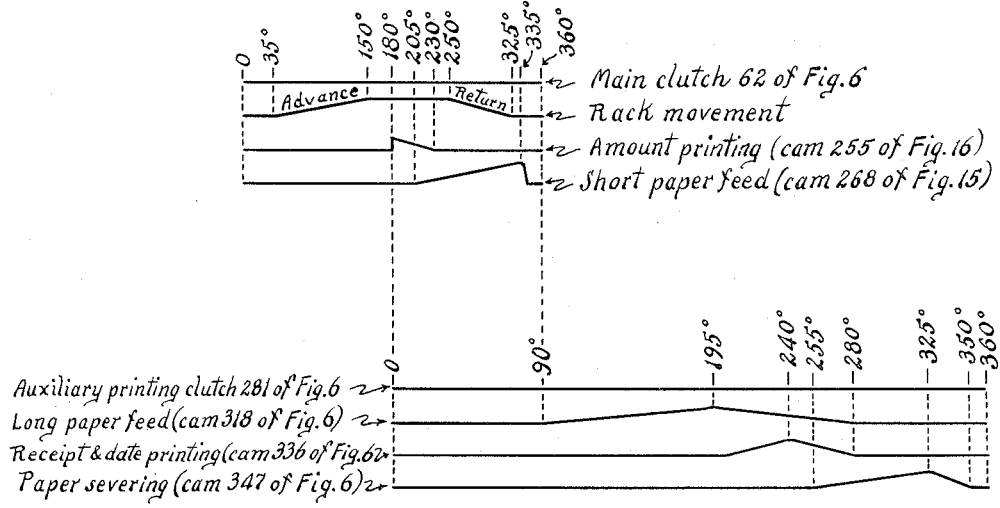

Fig. 17 is a timing diagram of the printing units of the machine.

Figure 6:
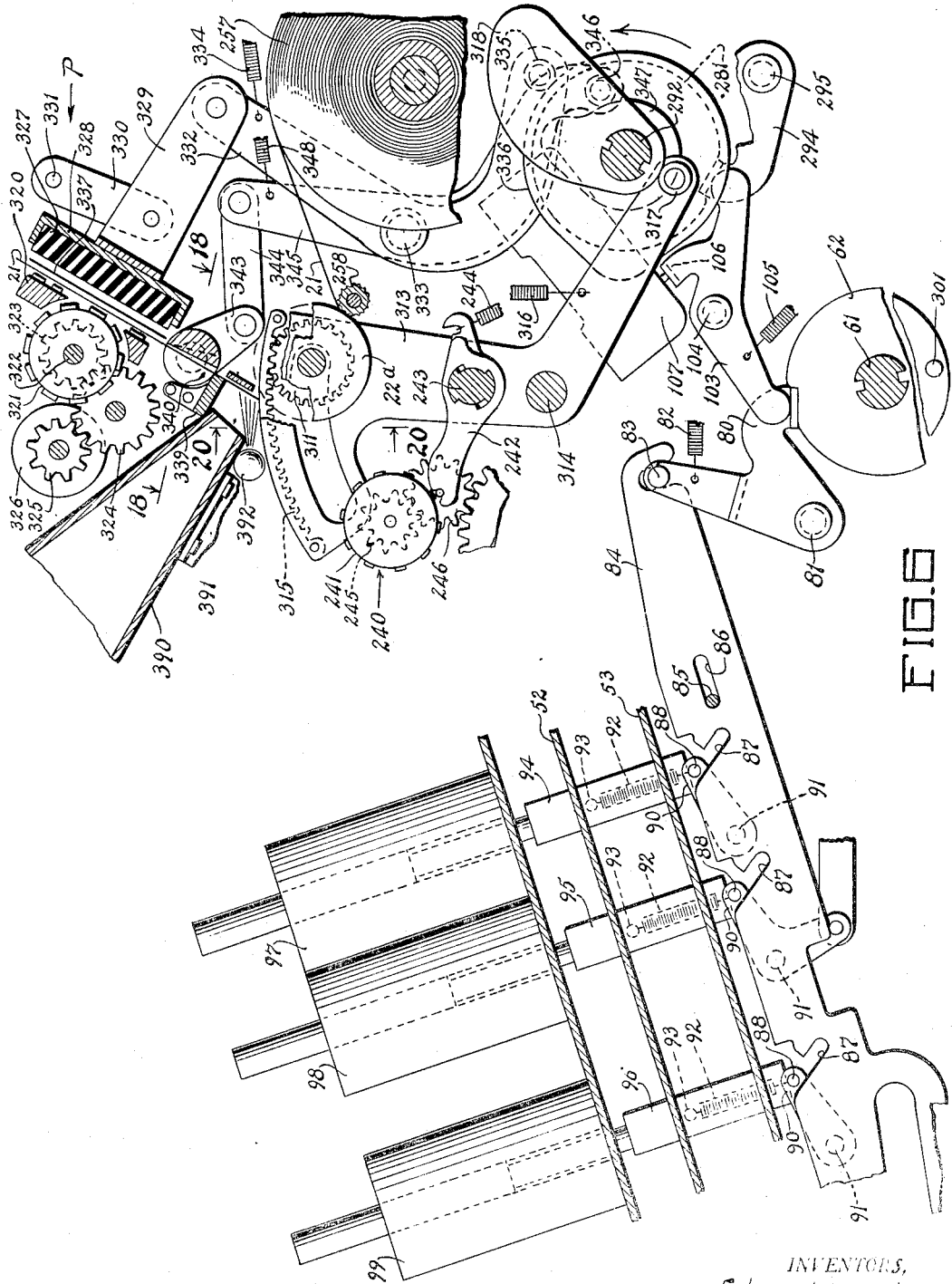
Fig. 6 is a view similar to that of Fig. 5 illustrating the clutch controls and printing mechanism.

Fig. 18 is a sectional plan view illustrating the paper severing device and is taken substantially along the line 18—18 of Fig. 6.

Fig. 19 is a schematic wiring diagram illustrating the circuit connections for the various amount keys, control bars, motor, etc.

Fig. 20 is a sectional elevational view of the long feed platen drive device and is taken along the line 20—20 of Fig. 6.

General construction

The particular embodiment of the invention disclosed herein is applied to the well known and commercially available Clary Duplex Cash Register disclosed and claimed in the co-pending application of V. S. Golemon, Serial No. 103,468 filed July 7, 1949, and since matured into Patent No. 2,656,976, issued on October 27, 1953. Various operating instrumentalities of this register, particularly of the computing section are disclosed and claimd in the patent to E. P. Drake, No. 2,472,696, issued on June 7, 1949, and the patent to R. E. Boyden, No. 2,583,810, issued on January 29, 1952. Therefore, for the sake of brevity, only that mechanism which embodies the present invention and that which directly cooperates therewith will be described herein in detail. It should be understood, however, that the invention may be equally well embodied in other forms of registers.

The machine in general comprises a machine cabinet 12, preferably fitted between counter sections as at 13 and 14 (Fig. 1). Top deck panels 15 and 16 are pivoted at 17 and 17a, respectively, to edge sections 18 and 19 formed integrally with the sides of the cabinet. The deck panels 15 and 16 and respective edge panel sections 18 and 19 are located flush with the top surfaces of the adjoining counter sections 13 and 14. Thus, when the panels are closed, as illustrated, articles of merchandise may be slid along over the counter sections and panels without interference.

A paper ejector slot 20 is formed in the deck panel 15 through which a paper tape 21 (see also Figs. 5 and 11)

having various items printed thereon by the register, may be fed. A viewing well 22 is also formed directly in front of the slot 20, permitting the cashier to view amounts printed on the tape 21 at a printing station located within the cabinet.

A keyboard 23 (see also Figs. 7 and 9) for controlling the register is located in an opening formed in the right-hand deck panel 16. The keys of the keyboard are located slightly below the top surface of the panel 16, permitting merchandise, etc., to be placed or slid thereover without touching the keys.

A register, generally indicated at 11 (Fig. 5) is located in the left-hand section of the cabinet. A cash drawer, generally indicated at 24, is located in the right-hand section of the casing, directly below the keyboard 23. The register 11, cash drawer 24 and keyboard 23 are all electrically interconnected as will appear hereinafter, whereby the keyboard is effective to remotely control various operations of the machine and opening of the drawer.

Keyboard

Figure 7:
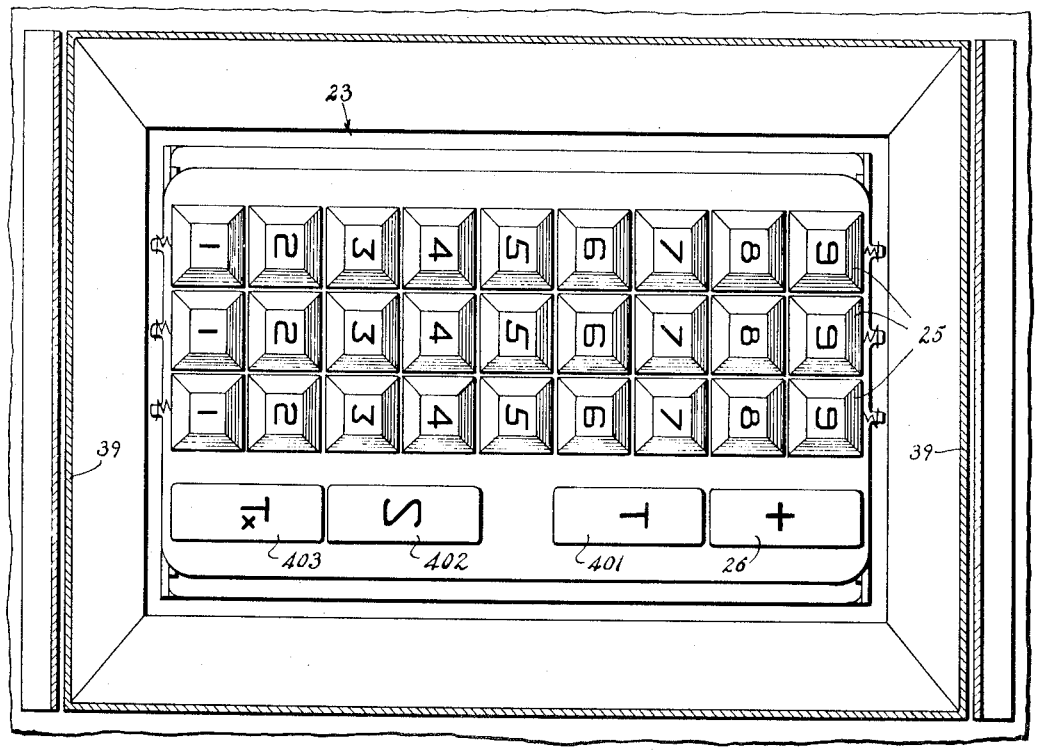
Fig. 7 is a sectional plan view taken substantially along the line 7—7 of Fig. 9 illustrating the remote control keyboard for the machine.

Amounts are entered into the machine by depressing appropriate ones of three banks of amount keys 25 of the keyboard 23 (Figs. 7 and 9). Amounts thus set up are entered in the machine upon depression of an add control bar 26, which is effective to cause entry of the amounts set up on the amount keys into two accumulators generally indicated at 27 and 28 (Fig. 5) in the register. Amounts thus entered are also printed on the paper tape 21 as the latter passes over a rotatable platen 22a.

Itemized totals are normally effected by depression of a total bar 401 which causes the amount printing mechanism to print the total on the paper strip 21 and also effects operation of an auxiliary receipt printing mechanism generally indicated at P to print a store name, date, etc.

Subtotalling of amounts in the upper accumulator 27 is effective by depression of a subtotal bar 402.

Tax amounts are entered in the machine by depression of a tax key 403 which is effective to control the machine in a manner similar to the control by the add bar 26.

Each of the amount keys 25 comprises a key top 31 integral with a key stem 32 which is guided for vertical movement in aligned guide slots formed in parallel key plates 33 and 34. The latter plates form a key frame secured within a box frame 35 which in turn is mounted on a floor plate 36 suitably secured to side walls, i. e., 37, of the machine cabinet.

An apron 39 extends downwardly from the deck panel 16 and surrounds the keyboard 23.

The various amount keys in each bank are yieldably urged into their upper illustrated positions by a tension spring 40 extending the length of the keyboard and suitably attached at its opposite ends to the key plate 33. This spring rests on cross ribs 38 formed across slots in the plate, the spring extending through openings in each of the key stems. Thus, upon depression of a key the adjacent portions of the spring are stretched and are effective to return the depressed key upon release.

The various amount key stems 32 overlie switches diagrammatically indicated at 41 (Fig. 19) located in a switch housing 41a and these various switches are connected through a multiple wire conductor 42 (Figs. 5 and 9) and electrical connectors 43 to respective ones of a plurality of key solenoids 44 mounted on the register 11.

The various solenoids 44 are effective when energized to depress and set a respective key stem 45 which, when set, serves as a stop to differentially limit movement of an associated drive rack 46. The latter, along with associated racks 63 connected thereto, is effective to drive one or both accumulators 27 and 28 to enter values therein and to also set the printing mechanism to print various amounts on the paper tape 21.

For this purpose, the various solenoids 44 are suitably mounted on a plate 48 suitably secured to the side frame plates of the register, one of which is shown at 50. The armatures 51 of the various solenoids rest directly on the key stems 45, the latter being guided in aligned slots formed in key plates 52 and 53, also suitably secured to the machine frame plates.

Spring means (not shown) are provided to individually urge the various key stems 45 and armatures 51 into their upper illustrated position. However, means are provided for locking the key stems in depressed position and for releasing any previously depressed key in the same bank upon depression of a new key stem. For this purpose each key stem 45 is provided with a cam lobe (not shown) which, when the key stem is depressed by its associated solenoid, rocks a locking bail 54 about trunnion support bearings 55 at opposite ends thereof against the action of a spring 56.

At the bottom of the key stroke the cam lobe passes below the locking bail 54, enabling the latter to be partially retracted by its spring 56 to a position wherein it latches the key stem depressed in the path of an associated shoulder 57 of the aligned drive rack 46.

The various rack shoulders 57 are so spaced relative to the key stems that the aligned rack 46 will advance a number of increments equal to the value of the depressed key stem before being arrested thereby.

A zero block 58 is formed on each locking bail 54 and when no amount key stem in the associated bank is depressed, the locking bail of that bank will be spring held in a position wherein the zero block 58 will be located directly in front of one of the shoulders 57 and thus prevent movement of the associated rack during subsequent operation of the machine. However, when an amount key stem 45 is depressed, the locking bail 54 in that bank will be held outward sufficiently to retain the associated zero block 58 out of the path of the aligned rack.

Drive

The register is driven by an electric motor generally indicated at 60 (Fig. 19) effective to drive a cyclically operable drive shaft 61 through a cyclic clutch 62 (Figs. 5 and 6), under control of various ones of the control bars 26, 401, 402 and 403, as will appear hereinafter.

The drive shaft 61 is effective, as will be described presently, to mesh one or both of the accumulators 27 and 28 with respective ones of the drive racks 46 and 63. The shaft 61 is also effective to differentially advance the racks until arrested by depressed ones of the amount key stems 45.

The upper racks 46 are individually guided for fore and aft movement at their forward ends by a movable shaft 64 and at their rear ends by a stationary shaft 65 (Fig. 3), the shafts extending through slots 66 and 67, respectively. The lower racks 63 are similarly guided by stationary cross shafts 68 and 70 embraced by slots 71 and 72, respectively, in each rack. The racks 46 and 63 in each order are coupled together by means of a plate 73 secured to the lower rack by rivets 74 and provided with a pin and slot connection 75 with the upper rack whereby the lower racks 63 are driven in there by their respective upper racks.

For the purpose of differentially driving the various pairs of racks forwardly, i. e., to the left in Fig. 5, and thereafter returning the same, the shaft 64 is driven sideways, fore and aft of the machine, by the main drive shaft 61 through drive means (not shown). The shaft 64 is yieldably connected to each of the upper racks 46 through pairs of opposed drive elements 64a pivotally supported on the shaft 64 and each provided with a roller 75 normally engaging a lateral depression formed at the closed end of the slot 66. A spring 76 is tensioned between the elements 64a and thus yieldably holds the rollers 75 in the slot depressions until the respective rack is arrested by a depressed key stem 45 or by the zero block 58 in the aligned key bank.

Clutch controls

Means are provided whereby depression of various ones of the control bars 26, 401, 402 and 403 will cause engagement of the main clutch 62 (Figs. 5 and 6) to effect operation of the machine.

The clutch is normally held in disengaged condition by a clutch dog 80 pivoted on a frame pin 81 and spring urged in a clockwise direction into engagement with the clutch 62 by a tension spring 82. The clutch dog is coupled through a pin and slot connection 83 to a clutch control bar 84. The latter is supported for fore and aft movement by frame studs, one of which is indicated at 85 embraced by elongated slots as at 86 formed in the control bar. Three diagonal control slots 87 are formed in the control bar 84 and underlie pins 88 carried by arms 90 fulcrumed on frame pins 91 and urged upwardly by spring 92 tensioned between the pins 88 and frame studs 93. The various pins 88 underlie key stems 94, 95 and 96 which directly underlie the armatures of solenoids 97, 98 and 99, respectively.

It will be noted upon reference to Fig. 19 that the solenoids 97, 98 and 99 are connected in circuit with respective ones of the bars 401, 402 and 403 across a power supply circuit 101 through a master switch 102 which is normally closed during machine operations as will appear hereinafter. Thus, depression of any of the latter keys will cause energization of their respective solenoids and engagement of the clutch 62.

The clutch dog 80 is also effective to cause operation of the machine motor 60 (Fig. 19) and for this purpose an ear on the clutch dog underlies a motor switch control lever 103 pivoted at 104 and urged counterclockwise by a tension spring 105 against the clutch dog ear. An ear 106 on the lever 103 engages an actuating element of a motor control switch 107 to normally maintain the latter open. As indicated in Fig. 19, the motor switch 107 is placed in series with the motor 60 across the power supply circuit 101 and thus normally holds the motor circuit open. However, as the clutch dog is rocked counterclockwise to cause engagement of the clutch, it will, through the lever 103, close the switch 107, thereby energizing the motor.

Means are provided whereby the add bar 26 upon depression is effective to likewise cause operation of the machine, and for this purpose depression of the add bar closes a switch 108 connected in circuit with an add solenoid 110 (Figs. 5 and 19) across the power supply circuit 101.

The solenoid 110 is suitably attached to a frame 111 integral with the aforementioned solenoid supporting plate 48.

The armature of add solenoid 110 is coupled through a pin and slot connection 112 to an arm 113 fastened on a rock shaft 114 suitably supported in bearings formed in the frame plates of the register. A second arm 115, also secured to the rockshaft 114, carries a roller engageable with a cam surface 116 formed on a forward extension of the clutch control bar 84 (see also Fig. 6) whereby energization of the solenoid 110 will cause forward movement of the clutch bar to effect engagement of the clutch 62 and operation of the motor.

Accumulator controls

Each of the accumulators 27 and 28 (Fig. 5) comprises independently rotatable accumulator gears, each adapted to mesh with an upper rack gear section 117, or lower rack gear section 118 of an associated rack. Suitable tens transfer mechanism (not shown) is operatively connected between adjacent ones of the accumulator gears as is well understood in the art and as is described in the aforementioned Drake patent.

The various accumulator gears forming the upper accumulator 27 are rotatably mounted on an accumulator shaft 120 suitably guided (in a manner not shown) for vertical movement.

Referring to Figs. 13 and 14 in particular, the accumulator shaft 120 is provided with rollers on opposite ends thereof, one of which is shown at 121, and each roller is embraced by a cam groove formed in a box cam, one of which is shown at 122, pivoted on a frame stud 123. Suitable means (not shown) are provided to transfer movement from the cam 122 at one end of the accumulator shaft 120 to the like cam at the opposite end whereby to effect parallel movement of the accumulator.

The various accumulator gears are normally maintained out of mesh with their associated racks, and for this purpose, the under edge of the box cam 122 is provided with a V-shaped notch normally engaged, as illustrated, by a roller 124 carried on a centralizer lever 125 pivoted at 126 and urged clockwise by a spring 127. However, clockwise rocking movement of the cam 122 from its central position will raise the accumulator 27 to mesh its various bears with the upper rack gear sections 117 of the associated racks 46 to effect additive entries therein, while counterclockwise rocking of the cam from its neutral position will lower the accumulator into mesh with the lower rack gear sections 118 preparatory to totalling and sub-totalling operations.

Means are provided for selectively rocking the cam 122 to raise or lower the accumulator 27, and for this purpose a pair of pins 128 and 130 are mounted on the cam 122 on opposite sides of the pins 123. These pins are arranged to be engaged by a hook member 131 pivoted to a three-arm cam follower 132 which is pivotally supported on the aforementioned stationary shaft 65. The cam follower is urged counterclockwise by a spring 133 to maintain a roller 134 on a depending arm thereof against a cam 135 keyed on the shaft 61. The latter cam has a high portion extending substantially half-way around its periphery, whereby to rock the cam follower 132 clockwise and thereby move the hook member 131 rearwardly, and hold it in a rearward position during approximately the first half of a machine cycle during which time the racks are yieldably advanced to the left in Fig. 5.

If, during rearward movement of the hook member 131 the latter is maintained in its neutral position illustrated in Fig. 13, it will be ineffective to rock the box cam 122, and the accumulator will therefore be maintained in its neutral or non-adding position during the machine cycle. However, if the hook member is held in a raised or lowered position during its rearward movement wherein it embraces one or the other of pins 128 and 130, it will be effective to rock the box cam 122 clockwise or counterclockwise, respectively, and thus raise or lower the accumulator.

The lower accumulator 28 is actuated into an upper or lower position into mesh with the upper and lower rack sections of the various racks 63 in precisely the same manner as is the upper accumulator, and for this purpose the accumulator shaft 136 supporting the various accumulator gears of the lower accumulator is arranged to be actuated by box cams, one of which is shown at 137, pivoted at 138 and provided with pins 139 and 140. A hook member 141 is engageable with one or the other of the latter pins and is connected to a three-arm lever 143 pivoted on the shaft 70. The lever 143 is connected to the aforementioned cam follower 132 by a link 144 whereby actuation of the cam follower 132 by cam 135 will transmit like rearward movement to the two hook members 131 and 141.

Means are provided for setting the hook members 131 and 141 into their upper or lower accumulator positioning positions under control of the various machine control bars 26, 401, 402 and 403. For this purpose, the upper hook member 131 is connected through a pin and slot connection 145 to a bell crank 146 fulcrumed at 147 and the latter is coupled through pin and slot connection 148 to a rearward extension of a control plate 150. The latter is guided for fore and aft movement by rollers 151 carried by two of the aforementioned pins 91 and embraced by elongated slots 152 formed in the plate 150.

The plate 150 and the hook member 131 are normally yieldably held in their illustrated central or neutralized positions by a centralizer comprising opposed arms 153 independently pivoted on a frame stud 154 and urged against opposite sides of a pin 155 on the plate 150 by a spring 156. The arms 153 also yieldably embrace a frame stud 157 and thus normally maintain the plate and hook member in their central positions.

The lower hook member 141 is likewise coupled through a pin and slot connection 158 to a bell crank 159 pivoted at 160 and connected by a link 161 to a second control plate 162, the latter being located in juxtaposition with the control plate 150 and likewise supported for fore and aft movement by elongated slots therein which embrace the rollers 151. The plate 162 and hook member 141 are also held in their neutral positions illustrated in Fig. 13 by a centralizer device generally indicated at 163 similar in all respects to the centralizer comprising arms 153 etc., for the plate 150.

The control plates 150 and 162 are provided with irregularly shaped slots 164 and 165, respectively, into both of which extends an ear 166 of an actuating lever 167. The latter is pivotally connected at 168 to a cam bar 170 supported for fore and aft movement by swinging links 171 suspended from frame pins 172 and thus forming a carrier for the lever 167.

The cam bar 170 is normally held in its central position illustrated in Fig. 13, wherein the lever 167 may freely traverse the slots 164 and 165, by a centralizer 173 pivoted on a frame stud 174 and urged counterclockwise by spring 175 to normally maintain a roller 176 thereon in a V-shaped centralizing notch formed on the upper edge of the cam bar 170.

Means are provided whereby the various machine control solenoids, under control of the depressible machine control bars, are enabled to position the cam bar 170 into one of two settings on opposite sides of its neutral position, and thereby selectively control the positioning of one or both accumulators. For this purpose, the aforementioned pins 88 (see also Fig. 6) associated with the total and subtotal key stems 94 and 95, respectively, overlie forwardly inclined camming surfaces 177 formed on the cam bar 170. Thus, depression of either of the key stems 94 and 95 will came the bar 170 forwardly, and through the actuating lever 167 will likewise move one or another of the control plates forwardly, depending upon the setting of the lever 167 about its pivot 168 as will appear presently. On the other hand, depression of the tax key stem 96 will cause the pin 88 associated therewith to engage a rearwardly inclined camming surface 178 on the cam bar 170 to move the actuating lever 167 rearward, whereby to likewise move one or both of the control plates.

The add solenoid 110 (Fig. 5) is also effective through the aforementioned arm 115 to move the cam bar 170 rearwardly, and for this purpose the latter arm through its roller 180 (Fig. 13) is arranged to engage and rock the bell crank 181 counterclockwise about a frame stud 182, forcing a roller 183 thereon to engage and cam the bar 170 rearwardly.

The machine is intended to be operated as an itemizing cash registering machine whereby amounts set up on the various amount keys 25 are entered into both of the accumulators 27 and 28 (Fig. 5) in response to depression of the add bar 26 and tax bar 403, whereas, during totalling and subtotalling operations, in order to obtain a customer's total upon depression of the control bars 401 or 402, totals or subtotals are obtained from the upper accumulator only. However, at the end of a definite period of time, i. e., the end of a day, a grand total or grand subtotal of the transactions made during such period may be obtained out of the lower accumulator. This selection of accumulators for obtaining either customer's or grand totals and subtotals is effected by the setting of lever 167 into either of two positions about its pivotal support 168. For this purpose, the lever 167 is coupled through a pin and slot connection 184 to a slide 185 guided vertically by frame pins 186 which are embraced by elongated slots 187 in the slide. The slide 185 is connected through pin 188 to a second slide 189 having elongated slots also embracing the frame pins 186. Slide 189 is normally urged upwardly by a spring 190 extending between the lower pin 186 and a stud 191 on the slide 189, the latter stud supporting a roller 192 engageable in either of two notches 193 and 194 formed on the lower edge of a control slide 195. The latter is provided with an elongated guide slot 196 embracing a pair of frame pins 197.

A control lever 198, pivoted on a frame stud 200, is coupled through a pin and slot connection 201 to the slide 195 and is normally spring held in a clockwise rocked position by a tension spring 202, thus maintaining the lowermost notch 193 of slide 195 in engagement with roller 192. Thus, slides 189 and 185 cause the actuating lever 167 to normally assume its position shown in Fig. 13 wherein it engages the upper portions of the slots 164 and 165 in the two control plates.

It will be noted that the upper ends of the two control slots 164 and 165 are so formed that depression of the add or tax bars and consequent rearward movement of the cam bar 170 will cause actuating lever 167 to pick up both control plates 150 and 162 and thus effect setting of both accumulators 27 and 28 into their upper "add" positions. However, upon depression of the total and subtotal bars, and consequent forward movement of the cam bar 170, the actuating lever 167 will pick up and move forwardly only the control plate 150, and consequently only the upper accumulator 27 will be set for a totalling operation. This is so because the upper forward portion of the slot 165 in the control plate 162 is cut out as at 205 so that the lever 167 will be ineffective to pick up this plate during forward movement thereof, leaving the lower accumulator 28 in its neutral position.

On the other hand, the lower forward portion of the control slot 164 in plate 150 is cut out as at 206 so that when the lever 198 is moved to its forward or grand total taking position as shown in Fig. 14, and slides 189 and 185 become effective to rock the actuating lever 167 clockwise, forward movement of the latter in response to depression of the total or subtotal bars will be effective to carry with it only the control plate 162 to effect totalling out of the lower or grand total accumulator 28 only.

Fig. 14 illustrates the machine in a position part way through a cycle and with a grand total taking position wherein the total key has been depressed and the control lever 198 held in a forward position against the action of spring 202.

*Totalling and subtotalling controls*

As described in detail in the aforementioned Drake Patent No. 2,472,696, the accumulators 27 and 28 comprise second shafts 27a and 28a, respectively (Figs. 5 and 15) effective upon counterclockwise positioning thereof from their normal illustrated positions to set suitable zero stops 207 in positions to arrest ears 208 formed on the associated accumulator gears when the latter are returned to their zero registering positions by their associated racks.

The shafts 27a and 28a are rocked counterclockwise to zero stopping positions by power under control of the total and subtotal bars, and in order to accomplish this, arms 209 and 210 are suitably secured to respective ones of the shafts. The latter arms are coupled through pin and slot connections 211 and 212 to floating levers 213 and 214, respectively. The forward ends of the two levers 213 and 214 are connected together by a link 215 which, in turn, is pivoted to the lower end of a link 216, the upper end of which is connected through a pin and slot connection 217 to a cross link 218 intermediate its ends. The cross link 218 is pivotally connected at the opposite ends thereof to the pins 88 carried by the aforementioned arms 90 and underlying the total and subtotal key stems 94 and 95, respectively (see also Fig. 6).

Upon depression of either of the key stems 94 and 95 by their associated solenoids 97 and 98, the links 215 and 216 will be lowered sufficiently to rock the floating levers 213 and 214 about frame studs 220 and 221 to position shoulders 222 and 223 thereon directly in front of studs 224 and 225, respectively. The former pin 224 is carried on an extension of a cam follower 228 (see Figs. 13 and 14) and the latter pin 225 is carried on an extension of the lever 143. Thus, at the start of a total or subtotal operation under control of the total and subtotal bars, the pins 224 and 225 will be carried into engagement with the floating levers 213 and 214, thereby rocking the respective shafts 27a and 28a counterclockwise an amount sufficient to position the zero stops into zero blocking positions relative to their associated accumulator gears whereby the racks, when advanced, will be arrested in positions mechanically representing the total values previously registered by the accumulator.

In totalling operations, the selected accumulator is returned by the racks in a subtractive direction to zero during the first part of an operating cycle and is then returned to its neutral position at mid-cycle, while in subtotalling operations, the accumulator is first returned to zero during the first part of the cycle and is then again reset at its former accumulated value during the latter half of the cycle. Therefore, it is necessary during a subtotalling operation to maintain the accumulator in mesh with the drive racks until the latter have returend to their initial positions toward the end of the cycle. To this end a second cam 226 is mounted on the drive shaft 61 in juxtaposition with the aforementioned control cam 135, the cam 226 being provided with a high portion extending around the major portion of the periphery thereof. The cam 226 engages a roller 227 normally aligned coaxiallyq with roller 134 and carried by a second cam follower 228 also pivoted on the shaft 65 and urged counterclockwise by spring 229.

A slot 230 is formed in the cam follower 228 coextensive with a slot 231 in cam follower 132. It will be noted that the rearwardly extending arm of cam follower 228 is somewhat longer than the similar extension of cam follower 132. A pin 232 carried by a link 233 rides in one or both of the slots 230 and 231, depending on its position longitudinally of the machine. The link 233 is connected through a pin and slot connection 234 to a depending extension formed on the arm 90 associated with the subtotal key stem 95, and a suitable spring (not shown) biases the link rearwardly to normally maintain the link in its illustrated position wherein the pin 232 rides solely within slot 230. However, when the subtotal key stem is lowered, the link 233 will draw pin 232 to a position located within both slots 230 and 231. In this condition, the pin 232 will effectively couple both cam followers 132 and 228 together so that the cam 226 will become effective to hold a selected one of the hook members 131 in a rearward accumulator setting position throughout the major portion of an ensuing machine cycle, thereby effecting a subtotal operation.

*Amount printing mechanism*

Figures 3, 4:
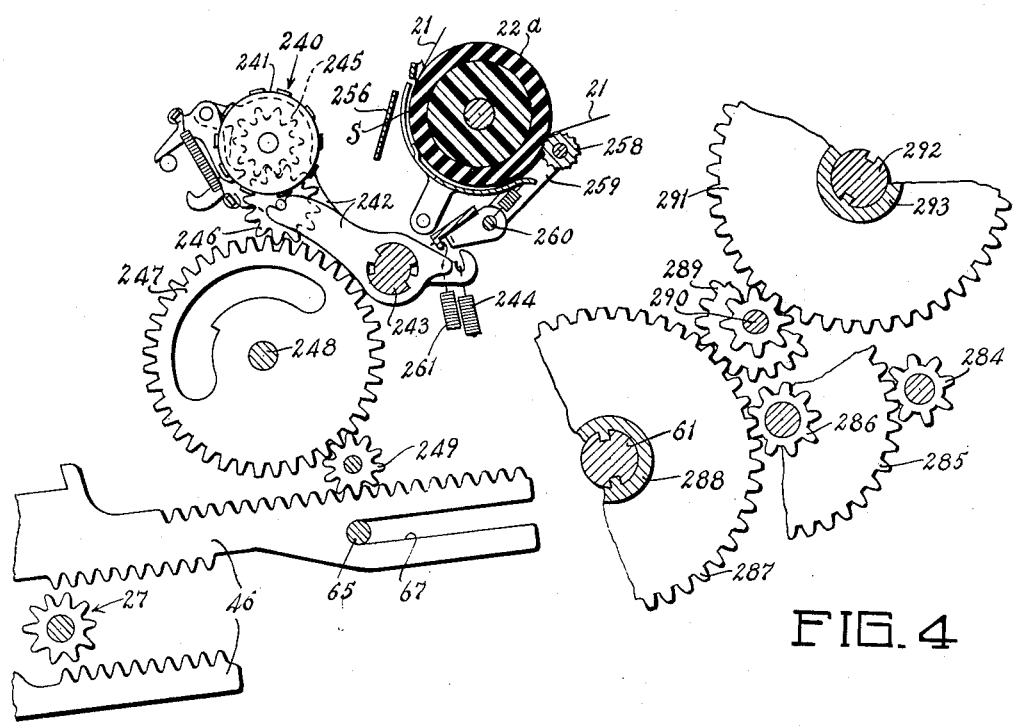
Fig. 3 is a sectional view through the printing mechanism, illustrating its connection with the actuator racks.
Fig. 4 is a fragmentary sectional view illustrating part of the drive train of the machine.

Amounts registered by the racks 46 and 63, during entry of amounts and totalling or subtotalling from either accumulator, are printed on the paper tape 21 as the latter passes over the platen 22a by means of an amount printing mechanism generally indicated at 240 (Figs. 3 and 5).

The amount printing mechanism comprises a series of printing wheels 241, one for each of the racks 46. Each wheels has thereon a series of type characters ranging from 0 to 9 and the wheels are so connected to the associated racks that they will print a digit corresponding to the value of the key depressed in the associated key bank or to the numerical position to which the rack is moved during its forward stroke.

Each wheel 241 is rotatably mounted on a separate arm 242 which is loosely keyed on a printer control shaft 243 and spring-urged clockwise toward the platen 22a by a tension spring 244 extending between the respective arm and a suitable portion of the frame. Each wheel 241 has integral therewith a gear 245 permanently meshing with a gear 246, also rotatably mounted on the associated arm 242. The arms 242 are normally held in their positions illustrated in Figs. 3, 5 and 6 by the shaft 243 during forward and return movement of the racks. Thus, the gears 246 will be held in mesh with aligned ones of a series of idler gears 247 during movement of the racks. The latter idler gears are independently mounted on a stationary cross shaft 248 and are continuously entrained with respective ones of the racks 46 through pinion assemblies, one of which is shown at 249.

Referring to Fig. 16, the printer control shaft 243 is fastened to a lever 250 urged clockwise by a strong tension spring 251 and provided with a roller 252 engaging a camming lever assembly 253. The latter is pivoted on the cross shaft 65 and has a roller 254 on the lower end thereof which rides on the periphery of a printer control cam 255 keyed on the main drive shaft 161.

As shown in Fig. 17, the cam 255 is so arranged that at approximately 180° of the main clutch cycle, the spring 251 will be enabled to rock the printer control shaft 243 clockwise, and thereby permit springs 244 (Fig. 3) to rock the printer arms 242 clockwise and thus carry the printing wheels forwardly into contact with a printing ribbon 256 and the paper tape 21 at a printing station S on the platen 22a. It will be noted that during this printing operation the racks, and consequently the idler gears 247, will be held stationary so that the gears 246 when returned by their arms 243 will resume their previous meshing relationships with the idler gears.

Suitable means (not shown) is provided to prevent clockwise rocking of the various arms 242 located in orders to the left of the type wheel 241 on which is registered the highermost significant digit so that zeros to the left of such significant digit will not be printed, as will be seen in the sample tape illustrated in Fig. 11.

The paper tape 21 is fed from a supply roll 257 and is maintained in contact with the platen as it passes thereon by pressure roll 258 carried by arms 259 which are pivoted at 260 and urged counterclockwise by a tension spring 261 to hold the pressure roll against the platen.

The platen 22a is normally rotated one increment in a clockwise direction after each amount printing operation thereon in order to advance the tape 21 for the printing of a new amount thereon, but when taking totals or subtotals the platen is rotated three increments in this direction. For the purpose of so advancing the platen, a ratchet 262 (Fig. 15) is attached to the platen and is fed by an upper ear of a pawl 263 pivotally connected at 264 to a cam follower 265. The latter is pivoted at 266 and is provided with roller 267 engaging a paper feed cam 268 keyed on the drive shaft 61. The upper end of the pawl 263 is urged to the left by a tension spring 269 extending between the lower end of the pawl and a control lever 270, spring 269 being also effective to normally hold the pawl in its upper illustrated position. A pin 271 carried by the lever 270 engages the forward edge of the pawl 263 and the leverage ratios involved between the spring 269, the pawl 263 and the lever 270 are so arranged that the pin 271 will normally hold the pawl in its position illustrated relative to the ratchet 262, in which position the plate 270 will limit against a frame pin 272. During amount entering operations, the pawl 263 will be moved downwardly by the cam 268 and against the action of spring 269, causing its upper ear to engage and advance the ratchet one increment or tooth space.

During totalling and subtotalling operations wherein it will be recalled that the floating levers 213 and 214 are rocked counterclockwise about their stationary support pins 220 and 221 a hook 273 on the upper lever 213 will be positioned directly behind a pin 274 on an arm 275 suitably fastened to a rock shaft 276. A second arm 277, also fastened to the shaft 276, is coupled through a pin and slot connection 278 to the control lever 270. Thus, during the subsequent machine operation in which the lever 213 is moved forwardly, the hook 273 will pick up pin 274, rocking arms 275 and 277, and causing lever 270 to move the pin 271 forwardly so that the pawl 263 will be positioned by spring 269 in a new path wherein it will be effective during subsequent downward movement to advance the ratchet 262 three tooth increments.

*Receipt printing mechanism*

A receipt printer, generally indicated at P (Figs. 5 and 6) is provided to print such identifying data as store name, date, etc., and is located directly above the amount printer 240. The receipt printer is operated by an auxiliary printer clutch 281 following totalling operations only in order to print the receipt data as indicated at 282 (Fig. 11) directly following the total amount 283.

The drive train for the auxiliary clutch 281 is illustrated in Fig. 4 wherein a motor operated gear 284 drives a compound idler 285—286, the small diameter gear of which meshes with a gear 287. The latter is rotatably mounted on the main drive shaft 61 and is connected through hub 288 (in a manner not shown) to the driving side of the main clutch 62 for the purpose of driving the latter. A comopund idler 289, rotatably mounted on a frame stud 290, connects the gear 287 with a gear 291 rotatably mounted on a printer control shaft 292. A hub 293 on the latter is connected (in a manner not shown) to the driving side of the clutch 281. It will be obvious that the arrangement of the compound idler 289 is such as to rotate the auxiliary clutch 281 at one-half the speed of the main clutch.

The auxiliary clutch is controlled by a clutch dog 294 (Figs. 5 and 6) in the same manner as the main clutch 62 is controlled by the clutch dog 80. The dog 294 is pivoted at 295 and connected to one end of a control link 296, the other end of which underlies the pin 88 associated with the total key stem 94. A spring 297 tensioned between the link 296 and a frame stud 298 biases the link in an upper position shown in Fig. 5 wherein it engages a frame stud 299, the spring also urging the link rearwardly to normally hold the clutch dog 294 in clutch disengaging condition. Upon depression of the total key stem 94 in response to depression of the total bar 401, the link 296 will be likewise lowered to place an extension 300 thereof in the path of a pin 301 mounted on the driven portion of the clutch 62. As the link 296 is so lowered a latch 302, pivoted on a frame pin 303, is moved by spring 304 to a position latching the link in its depressed position, the latch then resting against the pin 299. Consequently, at approximately 180° of the main clutch cycle, the pin 301 will engage and advance the link 296, thereby rocking clutch dog 394 counterclockwise to effect engagement of the auxiliary clutch 281. At this time the link 296 will move out from under latch 302, whereupon the spring 297 becomes effective to return the link to its upper position. It will be noted that an ear on the clutch dog 294 overlies a rearwardly extending arm on the aforementioned motor switch control lever 103 (see also Fig. 6), and is therefore effective to maintain the motor circuit until completion of a cycle of the clutch 281, whereupon the clutch dog will be rocked by spring 297 to disengage the clutch.

Means operable by the auxiliary clutch 281 are provided for feeding the paper tape 21 to position the total amount 283 (Fig. 11) printed thereon directly above the auxiliary printer P in advance of the receipt printing operation. For this purpose, the platen is provided with a bearing portion 308 (see also Fig. 20) on which is fixed a collar having a hub 309 extending in juxtaposition with a hub 310 of a gear 311 rotatably journalled upon the bearing portion 308. A helically wound drive spring 312 is fitted over and frictionally engages the hubs 309 and 310. Thus, rotation of the gear 311 in a counterclockwise direction, in which it tends to unwind the spring 312, will cause the spring to merely slip over the hub 309. However, rotation of the gear in the counterclockwise direction, tends to tighten the spring, causing it to grip the hub 309 and thus drive the platen therewith, the spring thereby forming a one-way driving connection between the gear 311 and the platen.

A sector lever 313 is pivotally mounted on a frame stud 314 and is provided with a gear sector 315 arranged in permanent mesh with the gear 311. A spring 316 tensioned between the lower end of lever 313 and a suitable part of the machine frame holds a roller 317 on the lever in engagement with a paper feed cam 318 keyed on the shaft 292. As indicated in Fig. 17, the cam 318 is so formed as to effect feeding of the paper directly after termination of operation of the main clutch 62 and prior to the receipt printing operation.

The receipt printer P comprises a stationary printer block 320 on which are formed type characters representing the store name, etc. The block 320 is suitably secured (in a manner not shown) to the machine framework and has an opening therein through which extend a series of date printer wheels 321 independently and rotatably mounted on a stationary cross shaft 322. Each of the wheels 321 has integrally secured thereto a gear 323 entrained with an idler 324 and gear 325, the latter having integral therewith a twirler disc 326, permitting manual setting of the dater wheels to selected date registrations. Access to the twirler discs is obtained by opening the deck panel 15 as will be noted hereinafter.

In order to obtain a print from the receipt printer, a flat platen 327 of rubber or the like, is provided, the latter being mounted in a casing 328 having an arm 329 extending rearwardly therefrom. The latter is supported for substantially parallel movement by a swinging link 330, suspended from a frame pin 331, and by a cam follower lever 332 pivoted on a frame pin 333 and urged in a clockwise direction by a spring 334 to maintain a roller 335 thereon in engagement with a printer cam 336 keyed on the clutch shaft 292.

The cam 336 is effective, as indicated in Fig. 17, to force the platen 327 against a printing ribbon 337 and the paper tape 21 directly after an operation of the paper feeding cam 318.

Means are provided for severing the paper tape upon printing of the receipt data 282 (Fig. 11) by the receipt printer, and for this purpose a stationary shear blade 339 is mounted on the machine framework, directly below the receipt printer. The latter cooperates with a rotary shear bar 340 (see also Fig. 18). Bar 340 is provided with trunnion bearing portions 340a formed at opposite ends thereof and journalled in bearings formed in the machine framework, part of which is indicated at 341 and 342.

The blade 340 is provided with diverging shear edges 360 which, when the blade is rocked clockwise, effect a shearing action on the paper tape.

A depending arm 343 on the shear blade 340 is connected by a link 344 to a cam follower 345, the latter being pivoted on the frame stud 333 and provided with a roller 346 which is held against the periphery of a shear cam 347 by a spring 348. The paper tape 21 passes between the stationary shear blade 339 and the rotatable blade 349. Toward the end of the auxiliary clutch cycle and after operation of the printer cam 336, the cam 347, as indicated in Fig. 17, becomes effective through cam follower 343 and link 344 to rock the shear blade 340 clockwise, thereby severing the tape directly below the receipt data 282 (Fig. 11).

*Drawer and drawer controls*

The drawer 24 (Figs. 1, 9 and 10), as noted before, is mounted directly below the machine keyboard 23 for movement to and from its illustrated closed position. For this purpose, the drawer is provided with channel members on opposite sides thereof, one of which is illustrated at 350, embracing rollers 351 rotatably mounted on frame partitions, one of which is illustrated at 363, forming part of the cabinet 12. The drawer, containing the usual coin and bill compartments 352, is urged toward an open position by a spring 353 extending between the rear of the drawer and a frame stud 354. However, the drawer is normally held in its illustrated closed position by a drawer latch 355 pivotally supported at 356 by a bracket 357 depending from the floor plate 36 of the cabinet. A spring 358 extending between the floor plate 36 and the rear end of latch 355 normally holds the latter in its drawer latching positioning.

A drawer opening solenoid 359 is mounted directly above the latch 355 by a bracket 360 suitably secured to the floor plate 36, and the armature 361 of the solenoid is connected by a link 362 to the latch. As shown in the wiring diagram of Fig. 19, it will be noted that the drawer opening solenoid 359 is connected in parallel with the totalling control solenoid 97, whereby energization of the latter upon depression of the total bar 401 will likewise energize the solenoid 359 to cause the drawer latch 355 to release the drawer, permitting the same to move to open position.

*Cabinet construction*

The register 11 is movable from its normal operating position within the casing (as shown in Fig. 5) to an exposed position outside the casing for servicing, paper and printing ribbon replacement, etc. For this purpose, the register framework comprising frame plates 50 and cross braces 364 and 364a, is mounted on channel members, one of which is shown at 365. on opposite sides of the register. The latter are supported by rollers 366 rotatably mounted on the sides of the cabinet.

Figure 8:
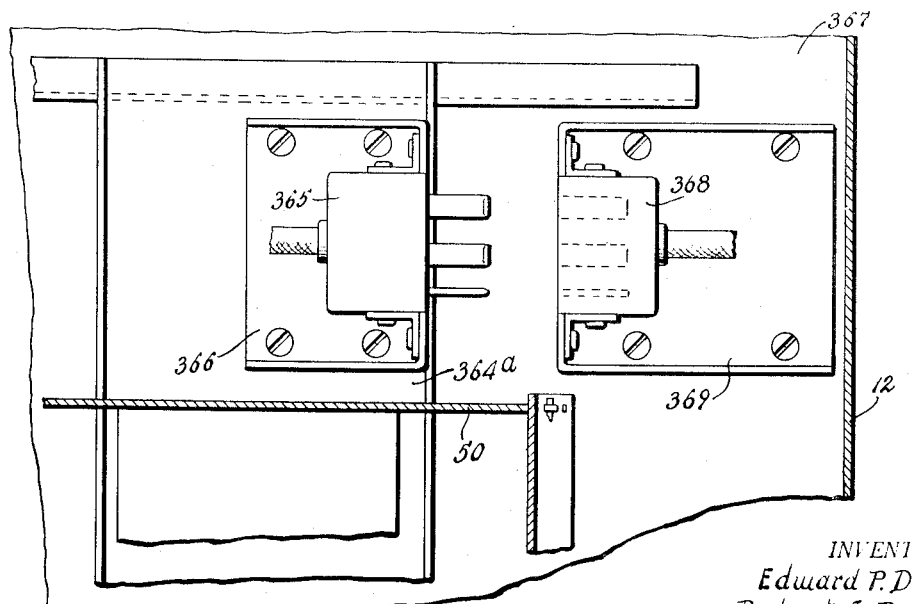
Fig. 8 is a sectional plan view taken substantially along the line 8—8 of Fig. 5 illustrating one of the multiple contact electrical connectors in uncoupled condition.

As noted hereinbefore, the various control solenoids of the register are normally electrically connected to the switches of the keyboard 23 through electrical connectors 43. However, in removing the machine from the casing the electrical connections formed by connectors 43 are broken. For this purpose, the connectors 43 (see also Fig. 8) are each formed in two parts, one part comprising a multi-contact plug 365 suitably secured by a bracket 366 to the cross brace 364a forming part of the framework of the register. The second part of each connector 43 comprises a multi-contact receptacle 368 suitably mounted on a bracket 369 extending from the base 367 of the cabinet 12. The various contacts of the plugs and receptacles are indicated at 370 in the wiring diagram of Fig. 19. Thus, as the machine is moved from its operating position shown in Fig. 5 to at least a partially removed position, as illustrated in Fig. 8, the plugs 365 and receptacles 368 separate to disconnect the various solenoids from their respective switches.

Normally, when the machine is in operating condition, the register is held in its position shown in Fig. 5 by a front door 373 pivoted to the base of the cabinet at 374 and, when in its closed position shown in Fig. 5, engaging the forward ends of the channel members 365.

The deck panels 15 and 16 and door 373 are normally locked in their closed positions by a key-controlled lock 375 (Figs. 5 and 12). For this purpose the deck panel 16 is provided with a lip 376 (Fig. 2) secured to the under surface thereof and underlying the adjacent edge of the deck panel 15, thereby requiring opening of the deck panel 15 before the panel 16 may be opened. In turn, the door 373 when in closed position, lies behind a ledge 377 on the deck member 15, thereby requiring opening of the latter before the door 373 may be opened.

As shown in Figs. 5 and 12, the lock 375 is carried by the door 373 and comprises a bolt member 378 rotatably mounted at 379 on the door. The latter can be rotated only by a suitable key 380 and comprises a hook portion 381 engageable over a pin 382 carried by a bracket 383 depending from the deck member 15 when the bolt is in its closed position illustrated in Fig. 12.

As a safety measure, the lock bolt 378 is also effective to control the master switch 102 (see also Fig. 19) whereby opening of the lock will be effective to remove power from the various operating circuits of the machine. The switch 102 is of the normally open type and is mounted on the door 373. A circuit closing element of the switch is engageable by a lever 384 pivoted on the door at 385 and provided with a pin 386 which is held against the arcuate periphery of the bolt by a spring 387. As the bolt is rotated in a clockwise direction as seen in Fig. 12 to release the deck member 15, a notch 388 in the periphery thereof registers with the pin 386, thereby permitting the spring 387 to retract the lever 384 and enable opening of the switch 102.

As shown in Fig. 5, the viewing well 22 comprises an opening in the deck member surrounded by walls 389a terminating in a magnifying lens 389 whereby to facilitate reading of an amount printed on the paper tape after the latter leaves the platen 22.

The lens 389 is normally in alignment with a converging tube 390 (see also Fig. 6) suitably secured by brackets 391 to the register frame. A lamp 392 located in series with one pole of the master switch 102 across the power circuit 101 (Fig. 19) is suitably supported (in a manner not shown) by the machine frame directly below the tube 390 so as to illuminate the paper tape 21 and thus facilitate reading of amounts thereon through the well 22.

*Electrical circuits*

The machine derives its power from the alternating current power supply 101, as shown in Fig. 19, and the various machine control solenoids 97, 98, 99, 110 and 359, as well as motor 60, are arranged to be connected directly across this power circuit upon closing of their respective switches and the master switch 102.

However, the power requirement of the remaining amount key solenoids 44 is not as great, and in order to reduce the physical size of the latter solenoids, the voltage applied thereto is reduced by a step-down transformer 390 connected between the power supply 101 and a power circuit 391 for the amount key solenoids. The alternating current thus derived is also preferably rectified by a rectifier 392. It will be further noted that one pole of the master switch 102 is located in the power circuit 391 whereby to open the amount key power circuit upon release of the lock 375.

*Operation*

Summarizing briefly the operation of the machine, it will be recalled that the accumulator selecting lever 198 (Fig. 13) is normally maintained in its rearwardly rocked position when the machine is in operating condition with the cabinet locked. Thus, items set up on the keyboard and representing parts of a sales transaction are entered into both upper and lower accumulators upon depression of the add bar 26.

When all items of the transaction have been entered, the subtotal bar 401 is depressed, which effects a customer's subtotal out of the upper accumulator only. The amount of this subtotal is recorded on the paper tape by the amount printing mechanism and the tape is advanced to position such amount directly in line with the lower end of the viewing tube 390. Thus, the cashier, having before him the net total of the sales transaction, may readily compute the amount of sales tax or similar extra charges based on sales and will set this amount in the keyboard. Upon depressing the tax bar 304, the tax amount will be entered into both accumulators and will be recorded at 400 (Fig. 11), directly below the subtotal amount, and along with a suitable tax symbol (Tx). The means for printing the tax and other symbols is not disclosed herein.

Upon recording the tax amount, the total bar 401 is depressed, thus totalling out of the upper accumulator, recording this amount as at 283, and automatically initiating a receipt printing operation effective to print the receipt data and to sever the tape.

It will thus be seen that the various customers' totals will be accumulated in the lower grand total accumulator. At the end of the day or other fiscal period, the grand total may be obtained by unlocking the cabinet 12 to gain access to the register. The lever 198 is then shifted forward to its alternate position shown in Fig. 14 and, while being so held, the total bar 401 is depressed, thereby obtaining a total out of the lower accumulator only.

It should be noted that the lock bolt 378 (Fig. 12) must be returned to its normal condition shown in Fig. 12 during such grand total operations in order to close the master switch 102, even though the cabinet door 373 is held open during the operation.

Having thus described the invention, what we desire to secure by United States Letters Patent is:

1. In a cash registering device, the combination comprising a cabinet, a horizontally extending top deck for said cabinet, said deck having a slot therein, a register in said cabinet, said register including means for feeding a record strip past a printing station and through said slot in an upwardly and rearwardly extending direction, a printing device for printing values on said record strip at said printing station, said deck having an opening therein, and a viewing well extending downwardly and rearwardly from said opening to a terminus adjacent said record strip and adjacent said printing station whereby to facilitate viewing of a value printed on said record strip by said printing device, said viewing well extending at substantially right angles to the position of said record strip adjacent said terminus.

2. In a cash registering device, the combination comprising a cabinet, a horizontally extending top deck for said cabinet, said deck having a slot therein, a register in said cabinet, said register including means for feeding a record strip past a printing station and through said slot in an upwardly and rearwardly extending direction, a printing device for printing values on said record strip at said printing sation, said deck having an opening therein, a viewing well extending downwardly and rearwardly from said opening to a terminus adjacent said record strip and adjacent said printing station whereby to facilitate viewing of a value printed on said record strip by said printing device, said viewing well extending at substantially right angles to the portion of said second strip adjacent said terminus, and means within said cabinet and outside of said viewing well for illuminating said strip adjacent said terminus.

3. In a cash registering device, the combination comprising a cabinet, a top deck for said cabinet, said deck being movable between an open and a closed position, a regitser in said cabinet, said register including means for guiding a record strip past a printing station, a printing device for printing values on said record strip at said printing station, said deck having an opening therein, walls carried by said deck surrounding said opening to form a viewing well extending into said cabinet, walls forming a second viewing well carried by said register and terminating adjacent said printing station, said wells etxending in alignment with each other when said deck is closed whereby to facilitate viewing of a value printed on said strip, and means supporting said register for movement horizontally into and out of said cabinet.

4. In a cash registering device, the combination comprising a cabinet including a top deck, said deck having a slot therein, a register in said cabinet, said register including a printing device for printing values on a record strip at a printing station, means for feeding said record strip past said printing station and through said slot, a second printing device for printing data on said record strip at a second printing station located intermediate said first-mentioned station and said slot, said deck having an opening therein, and walls extending downwardly from said opening to form a viewing well terminating intermediate said stations for framing a value printed on said record strip by said first-metnioned printing device.

5. In a cash registering device, the combination comprising a cabinet including a top deck, said deck having a slot therein, a register in said cabinet, said register including a printing device for printing values on a record strip at a printing station, means for feeding said record strip past said printing station and through said slot, a second printing device for printing data on said strip at a second printing station intermediate said first-mentioned station and said slot, and means intermediate said printing stations for severng said record strip.

6. In a cash registering device, the combination comprising a cabinet including a top deck, said deck having a slot therein, a register in said cabinet, said register including a printing device for printing values on a record strip at a printing station, means for feeding said record strip past said printing station and through said slot, a second printing device for printing data on said strip at a second printing station intermediate said first-mentioned station and said slot, means intermediate said printing stations for severing said record strip, said deck having an opening therein, and walls extending downwardly from said opening to form a viewing well terminating intermediate said severing means and said first-mentioned station whereby to frame a value printed on said strip by said first-mentioned printing device.

7. In a computing device, the combination comprising a cabinet, a register, means for removably mounting said register in said cabinet, said register including settable control elements for differentially controlling entry of amounts into said register, electrically operated devices for setting said elements, electric contacts carried by said register and electrically connected to said devices, current supply contacts carried by said cabinet, a keyboard mounted on said cabinet and including a plurality of manually depressible amount entering keys carried by said cabinet; and electric switches operable by said keys and electrically connected to said current supply contacts, said electric contacts being engageable with respective ones of said current supply contacts upon mounting of said register in said cabinet.

8. In a computing device, the combination comprising a cabinet, a register including settable control elements for differentially controlling entry of amounts into said register; electrically operated devices carried by said register for setting respective ones of said elements, electric contacts carried by said register and electrically connected to said devices, means for guiding said register into and out of said cabinet, current supply contacts carried by said cabinet, a keyboard mounted on said cabinet and including a plurality of manually depressible amount entering keys carried by said cabinet; electric switches operable by said keys and electrically connected to said current supply contacts, said guide means being arranged to guide said electric contacts into engagement with respective ones of said current supply contacts upon movement of said register into said cabinet.

9. In a cash registering device, the combination comprising a cabinet, a top deck for said cabinet, a register in said cabinet, said register including means for guiding a record strip past a printing station and a printing device for printing values on said record strip at said printing station; said deck having an opening therein, walls carried by said deck surrounding said opening to form a viewing well extending into said casing, walls forming a second viewing well carried by said register and terminating adjacent said printing station, said wells extending in alignment with each other when said deck is closed whereby to facilitate viewing of a value printed on said strip, means for guiding said register into and out of said cabinet, means supporting said deck for movement from a closed position to an open position to permit movement of said register out of said cabinet, electrically operated devices carried by said register for controlling said printing device, electric contacts carried by said register and electrically connected to said electrically operated devices, and current supply contacts carried by said cabinet, said guiding means being effective to guide said electric contacts into engagement with respective ones of said current supply contacts upon movement of said register into said cabinet.

10. In a cash registering device, the combination of a cabinet, a register, said registering including means for guiding a record strip past a printing station and a printing device for printing values on said record strip at said printing station; means supporting said register into and out of said cabinet, a top deck for said cabinet, said deck having an opening therein, walls carried by said deck surrounding said opening to form a viewing well extending into said cabinet and effective to facilitate viewing of a value printed on said strip adjacent said printing station, said deck being movable from a closed to an open position to permit movement of said register out of said cabinet, electrically operated devices for controlling said printing device, electric contacts carried by said register and electrically connected to the respective ones of said electrically operated devices, and current supply contacts carried by said cabinet, said supporting means being arranged to position said electric contacts in engagement with respective ones of said supply contacts upon movement of said register into said cabinet.

11. In a cash registering device, the combination of a cabinet, a register, said register including means for guiding a record strip past a printing station and a printing device for printing values on said record strip at said printing station; means supporting said register for movement into and out of said cabinet, a top deck for said cabinet, said deck having an opening therein, walls carried by said deck surrounding said opening and forming a viewing well extending into said cabinet and effective to facilitate viewing of a value printed on said strip adjacent said printing station, said deck being movable from a closed to an open position to permit movement of said register out of said cabinet, means including settable control elements carried by said register for controlling said printing device, electrically operated devices for setting said elements, electric contacts carried by said register and electrically connected to said electrically operable devices, current supply contacts carried by said cabinet, a plurality of manually depressable keys carried by said deck, and electric switches operable by said keys and electrically connected between a source of electric power and said current supply contacts, said electric contacts being engageable with respective ones of said current supply contacts upon mounting said register in said cabinet.

References Cited in the file of this patent

UNITED STATES PATENTS

| | | |
|---|---|---|
| 1,313,958 | Skerl | Aug. 26, 1919 |
| 1,753,991 | Langford | Apr. 8, 1930 |
| 1,903,337 | Hage | Apr. 4, 1933 |
| 1,926,827 | Turck | Sept. 12, 1933 |
| 2,014,432 | Gerhold | Sept. 17, 1935 |
| 2,044,559 | Balster | June 16, 1936 |
| 2,174,685 | Carroll et al. | Oct. 3, 1939 |
| 2,230,443 | Balster | Feb. 4, 1941 |
| 2,306,209 | Elofson et al. | Dec. 22, 1942 |
| 2,361,662 | Spurlino | Oct. 31, 1944 |
| 2,492,263 | Boyden | Dec. 27, 1949 |
| 2,527,996 | Handley | Oct. 31, 1950 |
| 2,543,899 | Dickinson | Mar. 6, 1951 |